UNITED STATES PATENT OFFICE.

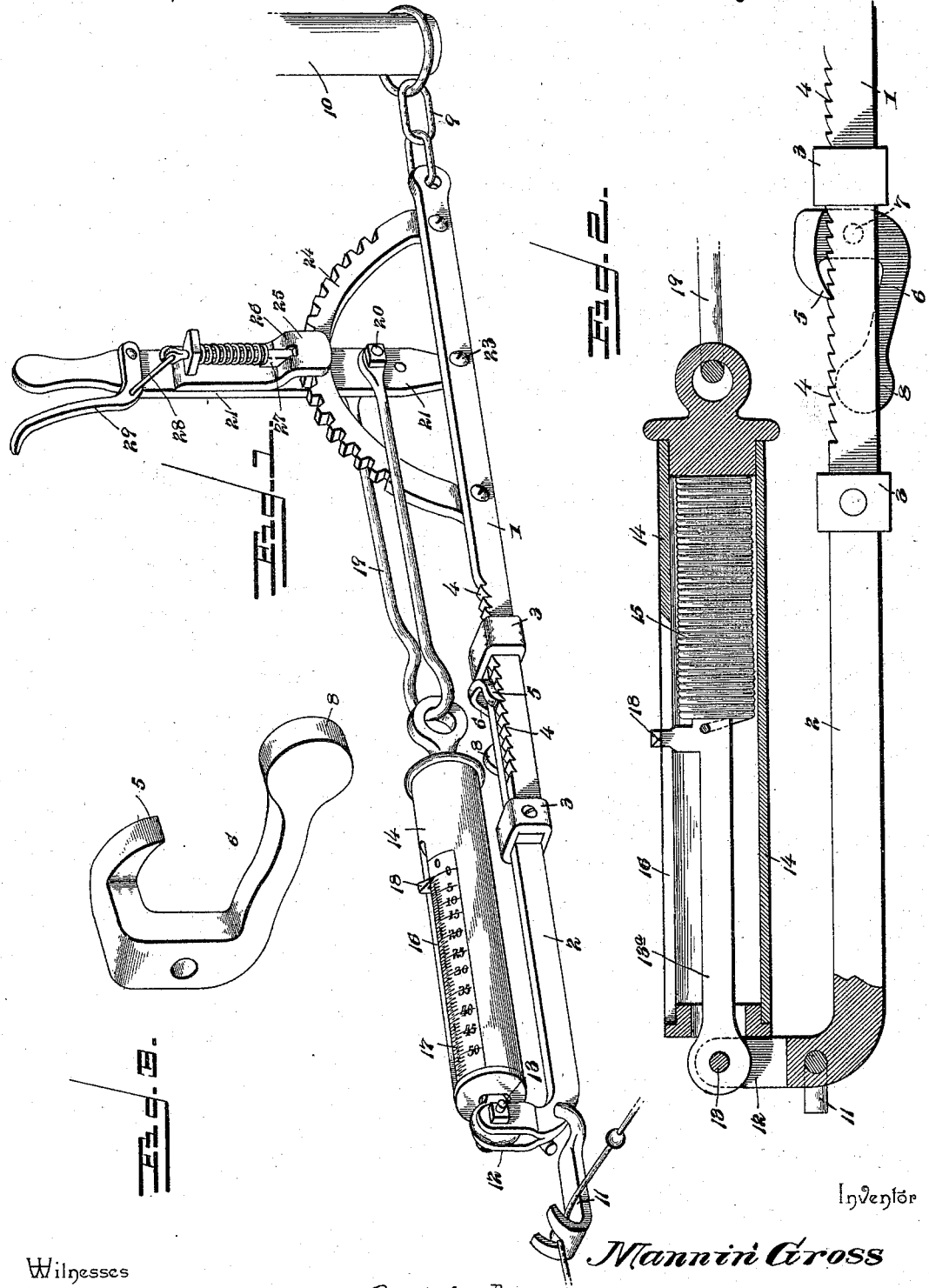

MANNIN GROSS, OF BURLINGTON, KANSAS.

WIRE-STRETCHER.

SPECIFICATION forming part of Letters Patent No. 541,850, dated July 2, 1895.

Application filed November 30, 1894. Serial No. 530,418. (No model.)

*To all whom it may concern:*

Be it known that I, MANNIN GROSS, a citizen of the United States, residing at Burlington, in the county of Coffey and State of Kansas, have invented a new and useful Wire-Stretcher, of which the following is a specification.

This invention relates to wire stretchers; and it has for its object to provide a new and useful device of this character that is especially adapted for use in stretching the check row wires of corn planting machines to provide means for maintaining the check-row wire at a uniform tension, whereby the planting can be done in accurate check row, that is to provide for insuring the planting of the corn at positively regulated intervals so that the hills will be in line with each other at right and oblique angles to the direction in which the planter is being driven, as well as in line with the direction of travel of the machine.

With these and other objects in view which will readily appear as the nature of the invention is better understood, the same consists in the novel construction, combination and arrangement of parts hereinafter more fully described, illustrated and claimed.

In the drawings, Figure 1 is a perspective view of a wire stretcher device constructed in accordance with this invention. Fig. 2 is an enlarged detail sectional view of the spring scale attachment. Fig. 3 is a detail in perspective of the bell crank gravity catch dog.

Referring to the accompanying drawings, 1—2 designate a pair of sliding stretcher bars that are arranged side by side and are adapted to be slid to and away from each other, and each of said stretcher bars carries at its inner end a rectangular slide loop 3, that loosely embraces the other stretcher bar and serves to connect the two bars together for a sliding movement. The stretcher bar 1, is provided on its upper edge for a portion of its length with a series of ratchet teeth 4, with which engages the angled catch point 5, projected from the upper end and one side of a bell crank gravity catch dog 6. This is pivotally mounted as at 7, at one side of the other stretcher bar 2, and at its extremity opposite the catch point thereof, the said gravity catch dog is weighted as at 8, to provide for normally holding the catch point 5, in engagement with the ratchet teeth on the upper edge of the stretcher bar 1. By reason of the disposition of the catch point of the gravity dog, it will be obvious that the sliding stretcher bars may be slid toward each other to shorten up the length of the stretcher, and the point of the dog will freely ride over the ratchet teeth 4, but the said dog will serve to lock the two bars together in their adjusted position and prevent the same from sliding in a direction away from each other.

One of the sliding stretcher bars, designated as 1, has loosely connected to the outer end thereof a short anchor chain 9, adapted to be suitably connected with an anchor stake 10, that is driven in the ground at the end of the field when the stretcher is used in connection with the check row wire of a corn planting machine; and the outer end of the other stretcher bar 2, has loosely connected thereto a bifurcated claw-hook 11, to which is connected the wire to be stretched. In stretching a check-row wire, the wire passes through the bifurcation of the hook and the button of the wire is held within the hook, as clearly illustrated in the drawings, so that in this applied position it is simply necessary to adjust the stretcher bar 2, to provide for stretching the check row wire to the desired tension.

The stretcher bar 2, is provided at its outer end with an upturned bifurcated arm 12, in which is pivotally bolted, as at 13, one end of a pointer bar 13ª, that works within a spring barrel 14, and has connected to its inner end one end of a spring 15, the other end of which is connected to one end of the barrel 14. The spring barrel 14, is provided with a longitudinally disposed slot 16, and a scale plate 17, at one side of said slot, and the slot 16, accommodates for movement therein the indicating pointer 18, that works over the scale plate and is carried by the inner end of the pointer bar 13ª. The end of the spring barrel 14, of the scale device just described, opposite the end through which the pointer bar projects, has pivotally connected thereto one end of a connecting link 19, the other end of which is pivotally and adjustably bolted as at 20, to an adjusting lever 21, pivotally bolted at its lower end as at 23, to one side of the stretcher bar 1. The lever 21, works at one side of a segmental rack bar 24, bolted at its ends to the stretcher bar 1, and the said lever is provided at one side with a flanged guide plate 25, which embraces the segmental rack bar 24, and has a bolt opening 26, to accommodate the lower end of a spring actuated catch bolt 27, supported for movement at one side of the lever 21. Loosely connected to the upper end thereof is one end of an adjusting link 28, the other end of which is pivotally connected to the angle of a bell crank hand-lever 29, this being pivotally mounted at one side of the handle end of the lever 21, and adapted to be grasped by the fingers to provide for adjusting the said catch bolt.

After the stretcher device has been properly connected as described, to a check-row wire, in order to stretch the wire to the proper tension, it is simply necessary to disengage the catch bolt from the segmental rack bar and move the adjusting lever in a direction that will exert a pull on the outer end of the stretcher bar 2, which carries the wire hook. As the stretcher bar 2, is slid back on the bar 1, in adjusting the wire to the proper tension, the gravity dog will freely ride over the ratchet teeth on the stretcher bar 1, and when the adjusting lever is eased up the gravity dog will catch in the ratchet teeth of the bar 1, and will hold the wire stretched at the tension desired without allowing the same to slip when the adjusting lever is eased up. The spring scale device interposed between the connection of the adjusting lever and the stretcher bar 2, provides means for indicating when the wire has reached the proper tension, and therefore the check row wires can be accurately adjusted to a uniform tension in the planting of a field. After adjusting the wires to the proper tension, the adjusting lever may be moved in a direction to ease up the spring scale attachment, inasmuch as the gravity dog will hold the wire at the tension to which it has been stretched.

It will be obvious that the herein described wire stretcher may be adapted for a variety of other purposes, such as for use in building wire fences, and it will be understood that changes in the form, proportion and the minor details of construction may be resorted to without departing from the principle or sacrificing any of the advantages of this invention.

Having thus described the invention, what is claimed, and desired to be secured by Letters Patent, is—

1. In a wire stretcher, the combination of a pair of longitudinally disposed stretcher bars slidably connected together, one of said bars having a series of ratchet teeth in its upper edge, a gravity catch dog pivotally mounted on the other of said bars and adapted to normally engage said ratchet teeth, an adjusting lever mounted on one of the stretcher bars, and a spring scale connection between said adjusting lever and the other stretcher bar, substantially as set forth.

2. In a wire stretcher, a pair of longitudinally disposed stretcher bars, each provided at its inner end with a rectangular slide loop loosely embracing the other bar, one of said stretcher bars having near its inner end a series of ratchet teeth, a bell crank weighted gravity catch dog pivotally mounted at one side of one of the stretcher bars and provided with an angled catch point adapted to normally engage the ratchet teeth of the other stretcher bar, a bifurcated claw hook pivotally connected to the outer end of one stretcher bar, an anchor chain connected to the outer end of the other stretcher bar, an adjusting lever mounted on one of the stretcher bars, and a spring scale connection between said adjusting lever and the other stretcher bar, substantially as set forth.

3. In a wire stretcher, the combination of a pair of loosely connected sliding stretcher bars, one of which is provided in its upper edge with a series of ratchet teeth, and the other of which is provided with an upturned arm at its outer end, a gravity catch dog pivotally mounted at one side of one of the stretcher bars and normally engaging with the ratchet teeth of the other stretcher bar, a hook connected to the outer end of one of the stretcher bars, an anchor chain connected to the outer end of the other stretcher bar, a segmental rack bar attached to the stretcher bar with the ratchet teeth, an adjusting lever supported to work at one side of the segmental rack bar and carrying a spring actuated catch bolt adapted to engage with the teeth thereof, a connecting link pivotally connected at one end to said adjusting lever, and a spring scale, one member of which is pivotally connected to one end of said connecting link, and the other member of which is pivotally connected to the upturned arm of the other stretcher bar, substantially as set forth.

In testimony that I claim the foregoing as my own I have hereto affixed my signature in the presence of two witnesses.

MANNIN GROSS.

Witnesses:
ARTHUR P. PRIER,
OSCAR C. ARENDT.